United States Patent [19]

Verrando

[11] 4,312,640
[45] Jan. 26, 1982

[54] HEAT-REACTIVATABLE ADSORBENT GAS FRACTIONATOR AND PROCESS

[75] Inventor: Marcel G. Verrando, Cortland, N.Y.

[73] Assignee: Pall Corporation, Glen Cove, N.Y.

[21] Appl. No.: 19,390

[22] Filed: Mar. 12, 1979

[51] Int. Cl.³ .............................................. B01D 53/04
[52] U.S. Cl. .......................................... 55/33; 55/58; 55/62; 55/74; 55/75; 55/179; 55/196; 55/387; 55/389
[58] Field of Search ...................... 55/28, 33, 26, 208, 55/179, 387, 389, 180, 196, 58, 62, 68, 74, 75; 219/10.55 R; 34/1, 4, 10, 39

[56] References Cited

U.S. PATENT DOCUMENTS

| | | | |
|---|---|---|---|
| 3,608,273 | 9/1971 | Fabuss et al. | 55/208 |
| 3,950,154 | 4/1976 | Henderson et al. | 55/179 |
| 4,055,001 | 10/1977 | Forster et al. | 34/4 |
| 4,094,652 | 6/1978 | Lowther | 55/204 |

FOREIGN PATENT DOCUMENTS

| | | | |
|---|---|---|---|
| 2107717 | 8/1972 | Fed. Rep. of Germany | 55/208 |
| 1092861 | 11/1967 | United Kingdom | 219/10.55 R |

Primary Examiner—Robert H. Spitzer

[57] ABSTRACT

A process and apparatus are provided for removing a first polar gas from a mixture thereof with a second gas. The gas mixture is passed through a sorbent bed having a preferential affinity for the first polar gas and the first polar gas is sorbed thereon so as to produce a gaseous effluent which has a concentration of first polar gas therein below a predetermined maximum. Then the polar gas sorbed on the sorbent bed is removed therefrom by application of microwave energy, at a temperature at which the sorbent is transparent to such energy, while passing a purge flow of gas in contact with the bed to flush out desorbed first polar gas from the bed. The bed is allowed to cool to a relatively efficient temperature for adsorption. The gas mixture is then again passed in contact with the bed. If two beds are used, one bed can be desorbed while the other is on-stream thereby maintaining a substantially continuous flow of effluent gas.

The apparatus of the invention provides a sorbent bed assembly having a microwave energy generator positioned to direct such energy into the sorbent bed for desorption of first polar gas from the bed.

25 Claims, 3 Drawing Figures

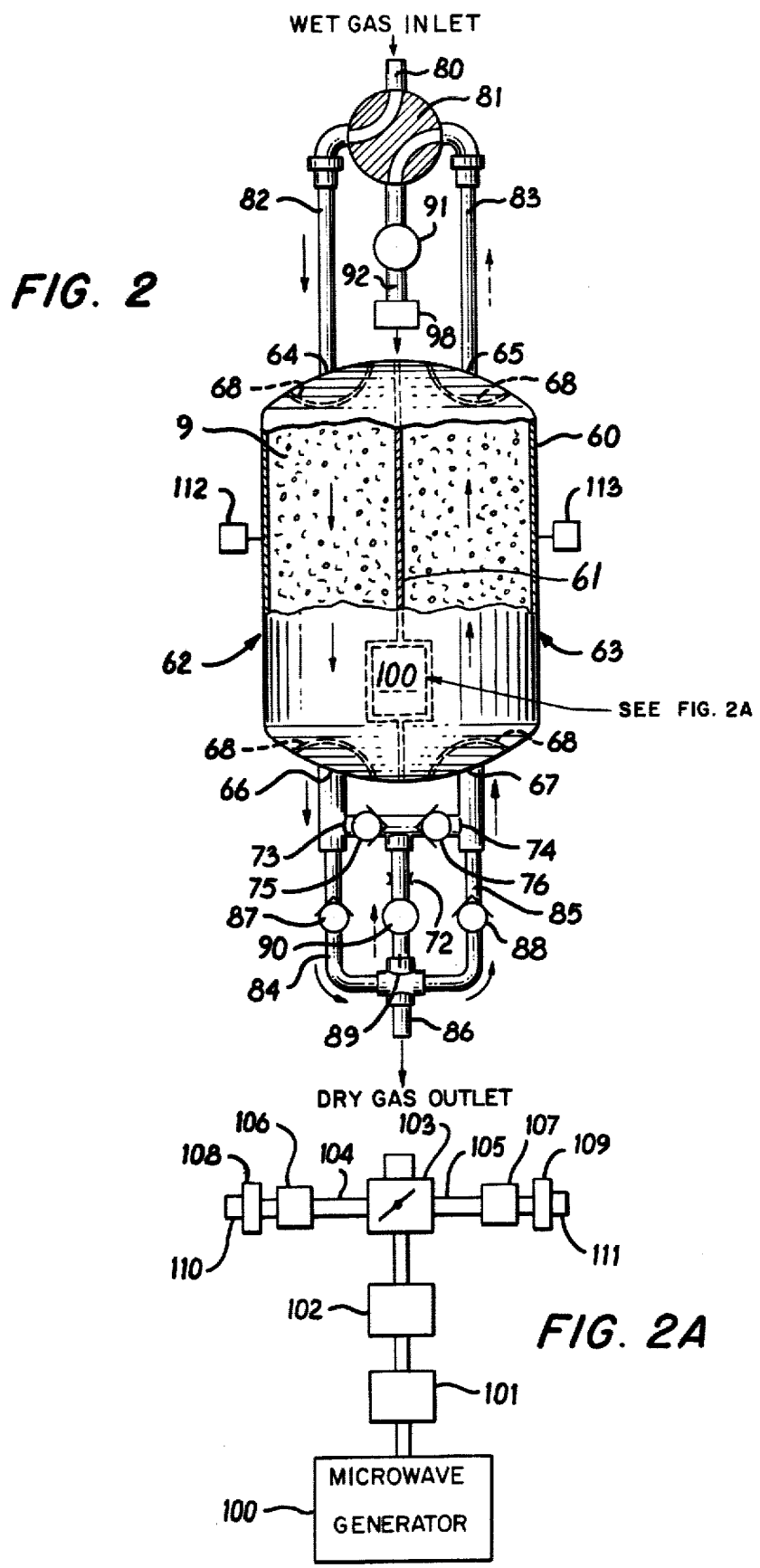

HEAT-REACTIVATABLE ADSORBENT GAS FRACTIONATOR AND PROCESS

Desiccant dryers have been marketed for many years, and are in wide use throughout the world. While one desiccant bed is sufficient in many applications, it is not capable of supplying a continuous effluent flow. The usual type is made up of two desiccant beds, one of which is on the drying cycle while the other is being regenerated. The gas to be dried is passed through the desiccant bed in one direction during the drying cycle, and then, when the desiccant has adsorbed moisture to the point that there is no assurance that the moisture level of the effluent gas will meet the requirements for the system, the influent gas is switched to the other bed, and the spend bed is regenerated by passing purge effluent gas in counterflow therethrough.

The purge gas may be heated before entering the bed, but in the usual system, the bed itself is provided with heaters, and the desiccant in effect baked out to remove the adsorbed moisture. The drying and regenerating cycle are usually equal in duration, and the drying cycle may be and usually is carried out at a higher gas pressure than the regenerating cycle. Counterflow of the gas purge is used to obtain rapid removal of the adsorbed moisture with a minimum volume of purge gas.

Such dryers are nearly always inefficient in the use of heat to regenerate the bed, because heat is applied throughout the entire desiccant bed, all of which is accordingly heated to the same temperature and for the same length of time, even though the adsorbed moisture content usually decreases significantly from the point of entry of the influent gas to the point of exit of the dried effluent. Furthermore, because of the high temperature required to regenerate the spent desiccant, the bed acquires a considerable amount of heat during the regeneration cycle, and this is necessarily wasted when the bed is perforce cooled down at the start of the drying cycle to a temperature at which adsorption can proceed efficiently. As is well known, the process of adsorption of moisture by a desiccant is accompanied by liberation of heat, and accordingly, the efficiency of adsorption is an inverse function of the temperature.

In accordance with U.S. Pat. No. 3,513,631, patented May 26, 1970, to Seibert and Verrando, Jr., a process for removing moisture from gas is provided, employing a desiccant bed which on the regeneration cycle is heated to at least 100° C. to remove adsorbed moisture, but the application of heat for this purpose is restricted to those portions of the bed having a high moisture content, thereby saving time during the regeneration, and also avoiding the waste in application of heat where it is not required.

The problem with heat-reactivatable adsorbent gas fractionators of these types is that relatively high temperatures of the order of 600° to 650° F. are required in order to drive out the moisture vapor adsorbed on the desiccant. At such temperatures, the life of the desiccant bed is greatly shortened, and it may even be possible to remove some water of hydration with each heat regeneration stage of the cycle, which of course destroys the desiccant.

In a paper entitled *The Effect of Regeneration Temperature and Pressure on the Adsorptive Capacity of Silica Gel in a Hydrocarbon Environment*, published in FUEL, Volume No. 48(3), by Science and Technology Press, Guildford, Surrey, England in 1969, Kotb and Campbell pointed out that the adsorptive capacity of hydrocarbon sorbents decreases with use, rapidly at first, and then more gradually. This degradation results from degradation of absorbed hydrocarbons, which leads to deposit of the degradation byproducts as contaminants on the sorbent, and such contaminants of course decrease the adsorptive capacity of the bed.

Moreover, many desiccants such as silica gels undergo chemical or physical change when held at elevated temperatures, which again interferes with adsorption. Thus, for example, silica gel while generally considered as amorphous does undergo some structural ordering, referred to as crystallization, at elevated temperatures. Increases of temperature and pressure produce a more ordered arrangement of the molecule, which reduces surface area, and lowers the adsorptive capacity. The result can be a shortening of the bed life from several years to several months.

In accordance with the present invention, it has been determined that the application of microwave energy to desorb a first polar gas and other polar gases adsorbed on a sorbent bed significantly reduces if it does not entirely overcome sorbent and sorbed polar gas product degradation encountered in conventional heat-regeneration systems. Moreover, the application of microwave energy does not damage the molecular structure of the desiccant.

Microwave energy is defined as a radiant form of energy transmitted as electromagnetic waves having frequencies with the range of about 0.03 to about 3000 giga Hertz, equivalent to from about $3 \times 10^7$ to about $3 \times 10^{12}$ cycles per second. See U.S. Pat. No. 3,555,693 patented Jan. 19, 1971 to Futer, column 1, line 51. Microwave energy is to be distinguished from electrical energy such as the discharge of an electrical current directly through a sorbent or desiccant bed, as described by Lowther U.S. Pat. Nos. 4,038,050 patented July 26, 1977 and 4,094,652 patented June 13, 1978, which is not radiant energy.

Most desiccants or sorbents at relatively low temperatures, usually at least below 500° F., are transparent to microwave energy, and consequently do not absorb such energy, nor are they heated or activated by it, except at elevated temperatures, of the order of 2000° to 3000° F. The microwave energy is preferentially absorbed by polar material such as the free water or other material sorbed on the desiccant or sorbent, and this polar material, thus activated, is desorbed. Nonpolar materials do not absorb microwave energy. Microwave energy thus absorbed is not available to activate any water of hydration of the desiccant or sorbent until all sorbed material has been desorbed. Removal of the water of hydration chemically bound to the desiccant or sorbent is undesirable, since it may result in collapse of the molecular structure, which will of course decrease the absorptive capacity. Consequently, application of the microwave energy is halted before water of hydration is removed, with the result that the desiccant or sorbent is little affected by the application of microwave energy.

Moreover, the sorbed water or other sorbed polar material is desorbed at a low temperature, approximately 200° F. Since it is sufficiently activated to escape from the sorbent at such low temperatures under the application of microwave energy, the sorbent or desiccant need not be heated. Accordingly, the microwave energy can be applied to desiccants or sorbents having a strongly bound water of hydration, such as molecular sieves and alumina, which cannot be heated to a higher temperature than this without danger of dehydration. For example, in sodium aluminosilicate $Na_{12}[AlO_2)_{12}(SiO_2)_{12}].3H_2O$ the water of hydration is liberated at about 1700° F. In alumina gels $Al_2O_3.0.5H_2O$ the water of hydration is liberated at 1500° to 1600° F. In neither case is the water of hydration removed by application of microwave energy.

In consequence, the application of microwave energy results in negligible heating of the desiccant itself, since it very likely will not even reach the water equilibrium temperature of approximately 190° F. at which the free or sorbed water is removed. The result is that there is virtually no desiccant damage during regeneration. Moreover, the application of microwave energy gives a much more rapid regeneration than conventional heat-reactivable adsorbent gas fractionators, and thus the sorbent beds can be made smaller, with less down-time for regeneration, and a resultant considerable conservation of the energy required.

Since there is no need to heat the desiccant bed, there is no need to heat the purge gas. In fact, the purge gas is required only in order to flush out the sorbed polar gas such as water that is desorbed from the sorbent bed, with a considerable saving in the amount of effluent gas required for purge. In consequence, smaller sorbent beds operating on faster regeneration cycles can be used when microwave energy is employed for regeneration as in the present invention.

In the process of the invention, the concentration of a first polar gas in a mixture thereof with a second gas is reduced to below a limiting maximum concentration thereof in the second gas by passing the mixture in contact with and from one end to another of a bed of a sorbent having a preferential affinity for the first polar gas, adsorbing first polar gas thereon to form a gaseous effluent having a concentration thereof below the maximum, and as the adsorption continues forming a concentration gradient of first polar gas on the bed progressively decreasing from the one end to the other end, and an increasing concentration of first polar gas in the second gas defining a concentration front progressively advancing in the bed from the one end to the other end as sorbent capacity therefor decreases; discontinuing passing the gaseous mixture in contact with the bed before the front can leave the bed, and the limiting maximum concentration of first polar gas in the second gas can be exceeded; and then desorbing the first polar gas adsorbed on the sorbent bed by application of microwave energy at a temperature at which the sorbent is transparent to microwave energy, preferably below 500° F., while by passing therethrough a purge gas flow to flush desorbed first polar gas from the bed.

The process is applicable to sorption and desorption of any polar gas in mixtures thereof with other polar or nonpolar gases. Polar gases such as water, carbon dioxide, carbon monoxide, sulfur dioxide, sulfur trioxide, nitrogen oxides, boron trifluoride, ozone and ethanol are readily desorbed by microwave energy.

The process contemplates, as the preferred purge gas, gaseous effluent from the adsorption cycle, and a desorption at a gas pressure lower than that during adsorption, usually from 15 to 350 psi lower, and preferably at least 50 psi lower.

The advance of the moisture front in a bed of desiccant as it gradually adsorbs moisture is a well known phenomenon in the desiccant drying art, and is discussed in numerous patents, for example, Skarstrom U.S. Pat. No. 2,944,627. During the greater part of the drying cycle, the sorbent efficiently sorbs moisture from gas passing over it. When the sorbent capacity of the desiccant approaches zero, however, the moisture content of gas passed over it rises sharply. If moisture content, dewpoint or relative humidity of the gas be measured, and plotted against time, this usually sudden rise in moisture content is noted as a change in slope, and the increasing moisture content then rapidly approaches the moisture content of the influent gas. The resulting S-shaped portion of this curve in effect represents the moisture front, and if this be observed in terms of the length of the bed, it will be found to progress from the influent end to the effluent end of the bed as the adsorption cycle proceeds. The objective is to conclude the cycle before the front or change in slope of the curve reaches the end of the bed, since thereafter the rise is so rapid that delivery of undesirably moist effluent can hardly be prevented.

As a further feature in accordance with the invention, the regeneration cycle need not be and in most cases is not of a duration equal to the drying cycle, so that the application of microwave energy can be discontinued when regeneration is complete, and the remainder of the time can be used for any required cooling down of the regenerated bed, so that it is at a convenient and efficient temperature for adsorption when the flow of influent gas to that bed is resumed.

The gas fractionating apparatus in accordance with the invention comprises a sorbent bed having a preferential affinity for a first polar gas in a mixture thereof with a second gas and adapted for periodic regeneration at the conclusion of an adsorption cycle by removal of sorbed first polar gas by application of microwave energy, with a flushing flow of purge gas to remove desorbed first polar gas from the bed, preferably in counterflow to flow during adsorption, and means for applying microwave energy to the sorbent bed during such regeneration.

While the apparatus of the invention can be composed of one sorbent bed, the preferred system employs a pair of sorbent beds disposed in appropriate vessels, which are connected to the lines for reception of influent gas to be dried, and delivery of effluent dried gas.

The apparatus can also include a check valve or throttling valve for the purpose of reducing pressure during regeneration, and a multiple channel valve for cycling the flow of influent gas between the beds and for receiving the flow of effluent gas therefrom. In addition, a metering or throttling valve can be included to divert a portion of the effluent gas as purge in counterflow through the bed being regenerated.

It is preferred, in accordance with the invention, to pass purge gas in counterflow to influent gas being dried, in accordance with the normal practice of the art, to provide efficient flushing of desorbed first polar gas with minimum gas loss. It will, however, be understood that if desired the purge flow can be passed through the bed in the same direction as the influent flow, with a corresponding loss in efficiency.

The microwave generator can be any capable of generating electromagnetic waves having frequencies within the range from about 0.03 to about 3000 giga Hertz (equivalent to about $3 \times 10^7$ to about $3 \times 10^{12}$ cycles per second). Microwave generators of this capability are available commercially, and form no part of the invention. Microwave generators employing amplitron, magnetron, microtron or klystron tubes are suitable, but any type of microwave generating tube can of course be used. Exemplary microwave generators include Gerling Moore Model No. 4003, Cober No. S6, Toshiba No. TMG-490 and Thomson No. TH3094.

The size and capacity of the microwave generator will of course be selected according to the regeneration requirements of the system. Where the regeneration requirements are exceptionally large, the size of the generator may be increased, or it may be possible simply to multiply the number of generators, and feed the microwave energy into the sorbent bed at several locations, one for each generator used. It is also possible to use orthogonal mode transducers, to feed power from two or more generators into one sorbent bed, using only one opening.

The microwave generator is coupled with an isolator so as to protect the generator in the event of an operator error or other system fault.

In series between the isolator and the microwave generator is interposed a forward/reflect monitor, whose function is to shut off the microwave generator when the sorbent bed has been fully regenerated. While there is free water or sorbed polar gas present on the sorbent or desiccant, the microwave energy transmitted into the sorbent bed will be absorbed. When the sorbed material has been desorbed, however, the absorption of microwave energy drops appreciably, and the microwaves instead of being absorbed are reflected back through the microwave transmittal system towards the microwave generator. The interposition of the forward/reflect monitor before the generator makes it possible to detect the reflected waves, and, at a predetermined intensity corresponding to regeneration of the sorbent, cut off the microwave generator. The intensity of reflected waves corresponding to complete regeneration is of course determined by trial and error, for the particular adsorption/desorption system being used.

Any conventional forward/reflect monitor can be employed. These are available commercially, and form no part of the instant invention. Exemplary monitors include Gerling Moore No. 4009, and Cober 6 KW reflected power meter.

A single microwave generator, forward/reflect monitor and isolator combination is sufficient for an adsorption/desorption system having any number of sorbent beds. If there is more than one sorbent bed, however, it is necessary to provide separate microwave conducting systems transmitting the microwave energy to each of the beds, with a waveguide switch to divert the energy to the bed selected for regeneration. The transmittal system beyond the switch and before the sorbent includes waveguide segments, microwave windows, and subtuners, all of conventional design and forming no part of the instant invention.

The microwave windows must of course be transparent to the microwave energy used, must be capable of retaining the gas pressures within the sorbent bed, and are usually interposed at or in the walls of the vessel in which the sorbent bed is contained. Any microwave-transparent material can be used for the construction of the windows.

The waveguide segments are in effect conduits capable of conducting microwave energy without loss to the atmosphere. Suitable waveguide segments include Gerling Moore Nos. 4016 and 4017, and Cober No. WR284.

The microwave tuners employed in conjunction with the wave guide segments and windows are impedance matching devices. Gerling Moore No. 4027 is exemplary. Others include Microwave Fusion Model Tuner -S and Waveline Model 4360.

The gas fractionating system in accordance with the invention is illustrated in the drawings in the form of dryers, in which:

FIG. 2 is a schematic view of a two-bed dryer in accordance with the invention, held within a single tank.

FIG. 2A is a schematic view of the microwave energy generating system designated as "100" in FIG. 2.

Figure 1:
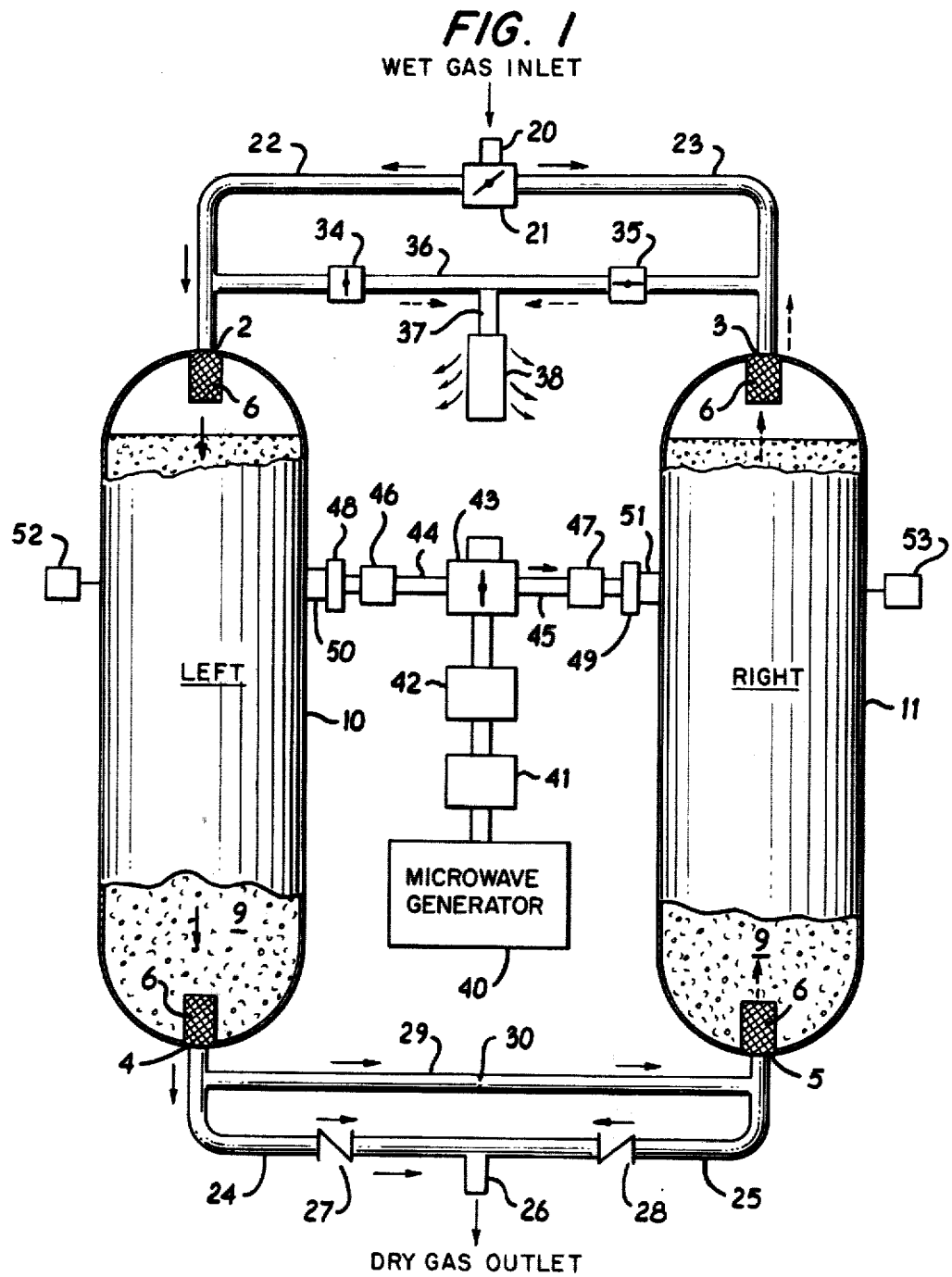
FIG. 1 is a schematic view of a two-bed two-tank dryer in accordance with the invention.

The dryer shown in FIG. 1 is composed of a pair of tanks 10 and 11, each having at their ends an inlet 2 and 3, and at the other end an outlet 4 and 5. Disposed across the inlets and outlets of each are stainless steel support screens 6, made of wire mesh or perforated steel plate, the purpose of which is to retain the desiccant particles within the tanks under gas flow in either direction, and to prevent the transmission of microwave energy either upstream or downstream.

In this case, the tanks are filled with desiccant, activated alumina, but optionally a molecular sieve such as $Na_{12}[AlO_2]_{12}(SiO_2)_{12}3H_2O$ or a silica gel can be used.

The tanks 10 and 11 are interconnected by a system of lines to ensure delivery of influent gas to be dried to the inlet of either bed, and the withdrawal of dried gas from the outlet of either bed, with lines for directing purge flow bled off from the effluent to the top of either bed for regeneration, and to vent it to atmosphere after leaving the bottom of each bed. This system is composed of a wet gas delivery line 20, which conducts wet gas to the four-way switching valve 21, and then through either line 22 or 23 to the top of tanks 10 and 11, respectively. Similar line connections 24 and 25 extend between the outlets of the two tanks. Flow along these lines to outlet line 26 is controlled by the check valves 27 and 28. Another line 29 interconnects lines 24 and 25 via a purge-metering and pressure-reducing orifice 30, which controls the volume of purge flow bled from the dry gas effluent for regeneration of the dryer bed on the regeneration cycle. The line 29 leads the purge flow through the orifice 30 to the outlets 4 and 5 of tanks 10 and 11. A purge exhaust line 36 interconnects lines 22 and 23 via exhaust valves 34,35 to vent purge to atmosphere via the vent line 37 and muffler 38.

The apparatus for developing and applying microwave energy to the sorbent bed in each tank for regeneration is disposed intermediate the two tanks, and is composed of a microwave generator 40, a forward/reflect monitor 41, a microwave isolator 42, and a waveguide switch 43, which directs the microwave energy through one of the two sets of waveguides 44, 45, microwave tuners 46,47 and microwave pressure windows 48,49, through which the microwave energy passes via the transition sections 50, 51 into the sorbent in one of the two tanks 10, 11 respectively.

Each tank 10, 11 also carries a temperature switch 52,53.

If tank 10 is on the drying cycle, and tank 11 on the regenerating cycle, then operation of the dryer is as follows: Wet gas at line pressure 25 to 350 psig entering through line 20 is diverted by valve 21 into line 22 to tank 10, and passes thence downwardly through the bed 9 to the outlet, whence it is conducted via line 24 past the open valve 27 to the exhaust line 26. Valves 28 and 34 are closed, preventing flow in line 25 from line 24 except via line 29 and orifice 30, and in line 36 from line 22, while valve 35 is open, permitting purge flow from tank 11 to proceed to vent line 37. A portion of the effluent is then passed through line 29, through orifice 30, where its pressure is reduced to atmospheric, due to open line 37, into line 25 to the bottom 5 of the second tank 11, which is on the regeneration cycle, and it passes thence upwardly through the bed 9 to the inlet 3 and thence through the line 36 and is vented to the atmosphere through the purge exhaust line 37 and muffler 38.

While this is going on, microwave energy is being produced in the microwave generator 40, and directed through the forward/reflect monitor 41 and isolator 42 into the switching device 43, where the microwaves are directed into the tank 11 through the microwave guide 45, microwave tuner 47, pressure window 49, and transition section 51. The microwave energy is absorbed by the water held in the desiccant, and the water is driven off as water vapor.

The purge gas flow is metered and reduced in pressure through the orifice 30, passes via lines 29 and 25 into the tank 11 at the outlet 5, and sweeps the desorbed water vapor out of the tank 11 through the inlet 3 and past the exhaust valve 35 in line 36 to the vent line 37 and the muffler 38, where it is vented to the atmosphere. When all of the water is driven out of the tank 11, a large percentage of the microwave energy will be reflected back through the waveguide 51 towards the microwave generator 40. The inlet and outlet screens 6 will prevent the energy from exiting in any other direction in the monitor 41 will sense the high percentage of reflected energy, and will shut off the microwave generator 40. The high temperature switch 53 serves as a back-up, to shut off the microwave generator in the event of a monitor malfunction.

When the predetermined cycle time has elapsed, an electric switch is activated, which first closes valve 35 to permit repressurization of the tank 11. At the end of a predetermined time period, allowing sufficient time for repressurization of tank 11, a motor is actuated to rotate the four-way switching valve 21 through 180°, so as to divert influent gas to line 23 to the top of the second tank 11 on the drying cycle, while at the same time the valves 27 and 35 are closed, and the valve 28 is opened. Valve 34 is now opened to depressurize tank 10 and open the purge system to atmosphere. Purge flow now passes through line 29, orifice 30 and line 24 to the bottom 4 of the tank 10, which is now on the regeneration cycle. At the time valve 21 is switched the microwave generator 40 is turned on, and the microwaves that are generated are directed through the forward/reflect monitor 41 and isolator 42 into the switching device 43. The switching device now directs the microwaves into the tank 10, through the microwave guide 44, microwave tuner 46, pressure window 48, and transition section 50, into the sorbent bed 9. The microwave energy is absorbed by the free water sorbed on the desiccant 9 in the tank 10, and the water is driven off as water vapor. The purge gas, proceeding via orifice 30, lines 29 and 24 into the bottom of the tank 10, sweeps the desorbed water vapor out of the tank 10 through the inlet 2, exhaust valve 34, lines 36 and 37, and muffler 38 into the atmosphere.

When all of the water is driven out of the tank 10, a large percentage of the energy will be reflected back through the waveguide towards the microwave generator. The inlet and outlet screens 6 will prevent the energy from exiting in any other direction. The monitor 41 will then sense the high percentage of reflected energy, and will automatically shut off the generator. The high temperature switch 52 serves as a back-up, to shut off the generator in the event of a monitor malfunctioning. Then the valves 21,27,28,34 and 35 are again switched at the end of the predetermined drying period, and the cycle is repeated.

Whenever the tank 10 or 11 is on the regeneration cycle, the microwave generator 40 is activated, and the desiccant bed is desorbed while being subjected to the purge flow for the time required to fully regenerate the desiccant. This time may be considerably less than the drying cycle time, which of course is determined not by a fixed time cycle, but by the moisture level in the gas in the bed as noted previously, whereupon the microwave generator is shut off.

Purge flow of gas is continued only for a time sufficient to cool the desiccant bed to room temperature, at which temperature the adsorption is more efficient, and then it too is automatically shut off by closing purge exhaust valves 34 and 35, repressurizing the spent bed, and readying it for the next cycle. Normally, from a half-hour to one hour is adequate to effect complete regeneration of a spent bed, and from ½ to 1 hour is enough to cool it. However, other times can of course be used, depending upon the desiccant that is employed.

The single tank dryer shown in FIG. 2 is composed of a single tank shell 60 within which is disposed a central barrier 61 separating the tank into two chambers 62 and 63, each having at one end an inlet 64 and 65 and at the other end an outlet 66 and 67. Disposed across the outlets of each are stainless steel support screens 68 made of wire mesh or perforated steel plate, the purpose of which is to retain the desiccant particles within the tanks, and to prevent transmission of microwave energy either upstream or downstream.

The tanks are filled with desiccant 9, such as activated alumina.

The chambers 62, 63 are interconnected by a system of lines, to ensure delivery of influent gas to be dried to the inlet of either bed, and the withdrawal of dried gas from the outlet of either bed, with lines for directing purge flow bled off from the effluent to the top of either bed for regeneration, and to vent it to atmosphere after leaving the bottom of each bed. This system is composed of a wet gas delivery line 80, which conducts wet gas to the four-way switching valve 81, and then through either line 82 or 83 to the top of chambers 62 and 63, respectively. Similar line connections 84 and 85 extend between the outlets of the two chambers. Flow along these lines to outlet line 86 is controlled by the switching valves 87 and 88. Another line 89 leads from the junction of lines 84 and 85 to a purge-metering valve 90, which controls the volume of purge flow bled from the dry gas effluent for regeneration of the dryer bed of the regeneration cycle. The line 89 leads the purge flow through pressure-reducing orifice 72 to one of lines 73, 74 and check valves 75 and 76, and to the outlets 66 and 67 of chambers 62 and 63. A purge exhaust line 92 leads from the four-way valve 81 past purge exhaust valve 91, to vent purge to atmosphere.

Disposed at the base of the tank 60 is a microwave energy generating system composed of a microwave generator 100 from which the microwave energy is directed through a forward/reflect monitor 101 and an isolator 102 into a switching device 103. The switching device directs the microwaves into the off-stream chamber, either 62 or 63, through microwave guides 104, 105, microwave tuners 106, 107, pressure windows 108, 109 and transition sections 110, 111. The microwave energy is absorbed by free water sorbed onto the desiccant, and the water is flushed out as water vapor by the purge gas past the purge exhaust valve 91, venting the purge to atmosphere. The inlet and outlet screens 68 prevent the energy from exiting except back through the waveguides towards the microwave generator. The forward/reflect monitor 101 will sense the high percentage of reflected energy present in the chamber when all of the water has been driven out, and will thereupon shut off the microwave generator 100. The high temperature switches 112, 113 serve as a backup, to shut off the generator 100 in the event of a monitor malfunction.

If chamber 62 is on the drying cycle, and tank 63 on the regenerating cycle, then operation of the dryer is as follows: Wet gas at line pressure, 25 to 350 psig, entering through line 80, is diverted by valve 81 into line 82 to chamber 62, and passes thence downwardly through the layer 78 to the outlet, whence it is conducted via line 84 past the open valve 87 to the exhaust line 86. Valves 88 and 75 are closed, preventing flow in lines 85 and 73, respectively. A portion of the effluent, as controlled by the purge valve 90, is then passed through line 89, through orifice 72, where its pressure is reduced to atmospheric, due to open purge valve 90, into line 74, past open valve 76 (valve 75 is closed, preventing flow in line 73) to the bottom of the second chamber 63, which is on the regeneration cycle, and it passes thence upwardly through the bed to the inlet 65 and thence through the line 83 to the four-way switching valve 81, and is vented to the atmosphere through the purge exhaust line 92 and valve 91.

While this is going on, microwave energy is being produced in the microwave generator 100, and directed through the forward/reflect monitor 101 and isolator 102 into the switching device 103, where the microwaves are directed into the chamber 63 through the microwave guide 105, microwave tuner 107, pressure window 109, and transition section 111. The microwave energy is absorbed by the water held in the desiccant, and the water is driven off as water vapor.

The purge gas flow is metered through the valve 70 and reduced in pressure through the orifice 72, passes via lines 89, 74, into the chamber 63 at the outlet 67, sweeps the desorbed water vapor out of the chamber 63 and via exhaust line 92 past the exhaust valve 91 and the muffler 98, where it is vented to the atmosphere. When all of the water is driven out of the chamber 63, a large percentage of the microwave energy will be reflected back through the waveguide 105 towards the microwave generator 100. The inlet and outlet screens 68 will prevent the energy from exiting in any other direction. The monitor 101 will sense the high percentage of reflected energy, and will shut off the microwave generator 100. The high temperature switch 113 serves as a back-up, to shut off the microwave generator in the event of a monitor malfunction.

When the predetermined cycle time has elapsed, an electric switch is activated, which first closes purge exhaust valve 91, to repressurize the chamber 63, and then about 30 seconds later switches the four-way switching valve 81 through 180°, so as to divert influent gas to line 83 to the top of the second chamber 63 on the drying cycle, while at the same time the valves 87 and 76 are closed, and the valves 75, 88 and 91 opened. Purge flow now passes through line 89, orifice 72 and line 73 past valve 75 to the bottom 66 of the chamber 62, which is now on the regeneration cycle. At the time valve 81 is switched the microwave generator 100 is turned on, and the microwaves that are generated are directed through the forward/reflect monitor 101 and isolator 102 into the switching device 103. The switching device now directs the microwaves into chamber 62, through the microwave guide 104, microwave tuner 106, pressure window 108, and transition section 110, into the sorbent bed 9. The microwave energy is absorbed by the free water sorbed on the desiccant 9 in the tank chamber 62, and the water is driven off as water vapor. The purge gas proceeding via valve 90, orifice 72, through lines 89, 73 into the bottom of the chamber 62 sweeps the desorbed water vapor out of the chamber through the line 82 and valve 81, and thence into the atmosphere via line 91 and valve 92.

When all of the water is driven out of the chamber 62, a large percentage of the energy will be reflected back through the waveguide towards the microwave generator. The inlet and outlet screens 68 will prevent the energy from exiting in any other direction. The monitor 101 will then sense the high percentage of reflected energy, and will automatically shut off the generator 100. The high temperature switch 112 serves as a back-up, to shut off the generator in the event of a monitor malfunction. Then valves 81,87,88,75 and 76 are again switched at the end of the predetermined drying period and the cycle is repeated.

Whenever the chamber 72 or 92 is on the regeneration cycle, the microwave generator 100 is activated, and the desiccant bed is desorbed, while being subjected to the purge flow for the time required to fully regenerate the desiccant. This time may be considerably less than the drying cycle time, which of course is determined not by a fixed time cycle but by the moisture level in the gas in the bed, as noted previously, whereupon the microwave generator is turned off.

Purge flow of gas is continued only for a time sufficient to cool the desiccant bed to room temperature, at which temperature the adsorption is more efficient, and then it too is automatically shut off by closing purge exhaust valve 91, repressurizing the spent bed, and readying it for the next cycle. Normally, from a half-hour to one hour is adequate to effect complete regeneration of a spent bed, and from $\frac{1}{2}$ to 1 hour is enough to cool it. However, other times can of course be used, depending upon the desiccant that is employed.

The process of the invention can be carried out utilizing any type of desiccant or sorbent that is transparent to microwave energy. Such desiccants and sorbents exhibit transparency only at relatively low temperatures. At elevated temperatures of 2000° to 3000° F. and above, most desiccants or sorbents are not transparent to microwave energy. At low temperatures, below 500° F., all are transparent. Between 500° and 2000° F., transparency is lost by many desiccants and sorbents. Consequently, the process of the invention is carried out at a temperature at which the sorbent or desiccant is transparent, and preferably below 500° F.

The desiccant or sorbent is preferably one having strongly bond water of hydration, such as molecular sieves or alumina. Also exemplary are silica gel, Mobil Sorbeads, magnesium sulfate, calcium sulfate, zeolites, both natural and synthetic such as chabasites, analcite, and the synthetic zeolites described in U.S. Pat. Nos. 2,306,610, 2,442,191 and 2,522,426.

The adsorption can be carried out at atmospheric pressure. However, since the rate and extent of adsorption increases with pressure, it is usually preferred that it be carried out at a superatmospheric pressure, generally from about 30 to about 10,000 psig. On the other hand, regeneration proceeds more efficiently and effectively at a reduced pressure, and thus it would be preferable in most instances to use a reduced pressure during this portion of the cycle. If the adsorption is carried out at a superatmospheric pressure, then regeneration is conveniently carried out at atmospheric or below atmospheric pressure, say, at 0.1 to 10 psi, such as by application of a vacuum pump, water pump, or steam ejector.

The flow rate will be determined according to system requirements. The faster the flow, the more frequent the cycling and/or the larger the volume of desiccant required. Flow rates up to 8000 scfm are readily accommodated without loss of effectiveness, with most desiccants.

The regeneration of the spent desiccant in accordance with the invention is effectively brought to completion by the use of microwave energy. The amount of energy applied is sufficient to remove substantially all of the adsorbed moisture, for maximum efficiency of operation. Of course, if maximum efficiency is unnecessary, then the regeneration need not be carried as far as substantially complete regeneration. However, inasmuch as the efficiency of adsorption decreases as the adsorbent takes up moisture, it is obviously more desirable in nearly every instance to completely regenerate, if possible.

It will of course be understood that the term "complete regeneration" is used in its normal sense. It is, of course, impossible to ever remove all of the moisture content of an adsorbent, even by long continued application of microwave energy.

The dryer size and operating conditions required for a given wet gas are, of course, readily determined by those skilled in the art. The variables to be controlled include the frequency and intensity of microwave energy applied, the volume of desiccant, the time for the regenerating cycle, and the moisture content of the desiccant reached during the drying cycle. The following computation will be exemplary.

Let it be assumed that the system provides two tank chambers having an internal diameter of 12 inches and a total length of 51 inches effective bed length, giving a volume of 3.34 cubic feet for a desiccant bed in each tank. Let it be further assumed that a bed of activated alumina be provided.

The influent flow proceeds towards the bottom of the bed through the alumina, and the purge counterflow proceeds from the effluent end.

It is customary to design a heat regenerated dryer on the basis that the total moisture content of the influent air during the drying period, assuming rated flow of saturated air, is less than 5% of the weight of the desiccant in the bed. To rephrase this criterion, it is assumed that virtually all the water is adsorbed by the influent one-third of the bed and the average water content of this part of the bed is 15% by weight.

In this case, one-third of the bed is one-third of 3.34 or 1.11 cubic feet. The desiccant weight in this portion of the bed is 54.5 lbs. and the weight of water to be collected is 15% of 54.5 lbs. or 8.2 lbs.

It is further customarily assumed in calculations that the maximum air inlet temperature is 100° F. unless more accurate data is available for a given application.

In this case, saturated air at 100° F. will contain 0.00279 lb. of moisture per cubic foot. Thus, for a one hour drying cycle, this bed can handle a flow rate of:

$$8.2/(60 \times 0.00279) = 49 \text{ cfm}$$

If the inlet pressure is 100 psig, the inlet flow rate can be:

$$49 \times (114.7/14.7) = 382 \text{ scfm}$$

It is thus evident from this computation that such a bed has a very high flow rate capacity.

The computation of the purge flow for such a bed would be as follows: For a 56 minutes regeneration cycle, allowing 2 minutes for depressurization, 2 minutes for repressurization, and 2 minutes' delay before switching the beds, there would be a lost regeneration time of 6 minutes, of a total cycle time of 56 minutes. The microwave generator can be operated during depressurization so that time is not lost, and the actual time lost is only 4 minutes.

During the remaining 52 minutes of the cycle, the bed is heated up and then cooled off. Only about ½ of the time period will be effective for regeneration so the purge flow must be capable of carrying off 8.2 lbs. of moisture in 26 minutes with an outlet gas temperature of 204° F., assuming the gas is only 80% efficient in taking moisture from the desiccant and therefore has a relative humidity of 80%. Under these conditions, each cubic foot of purge gas will hold:

$$0.80 \times 0.213 = 0.170 \text{ lb of moisture}$$

The purge flow must then be:

$$8.2/(0.170 \times 26) = 1.9 \text{ scfm}$$

Based on 380 scfm inlet flow, a 1.9 scfm purge is about ½% of the inlet flow.

The heat requirements are computed as follows:

The weight of desiccant in the heated portion of the bed is 64 lbs. The heat needed to heat this weight of desiccant to 200° from 100° F. is $$64 \times 100 \times 0.25 = 1,600 \text{ B.t.u.}$$

The heat required to desorb 8.2 lbs. of water is:

$$8.2 \times 1450 = 11,890 \text{ B.t.u.}$$

The bed can be adequately cooled in 26 minutes, leaving 26 minutes for heating time.

The heat required to warm the purge gas from 100° F. to 204° F. during the heating period is:

$$1.9 \times 0.075 \times 0.25 \times 104 \times 26 = 96 \text{ B.t.u.}$$

The total heat requirements, allowing about 5% for heat losses, are then 14,265 B.t.u. In order to provide this amount of heat in 26 minutes, a total of:

$$(14,265/3414) \times (60/26) = 9.64 \text{ kilowatts}$$

of heating capacity must be provided.

If the entire bed were to be heated to 300° F. as in a conventional unit and the time cycle held, the heat required to heat the entire desiccant bed (192 lbs.) from 100° F. to 300° F. would be 9600 B.t.u. This amount of heat could not be carried off in 26 minutes by 1.9 scfm of purge gas so the purge would have to be increased to about 60 scfm. The heating period is 26 minutes and the heat required to heat the purge gas becomes:

$$60 \times 0.075 \times 0.25 \times 200 \times 26 = 5850 \text{ B.t.u.}$$

The total heat requirement, allowing 10% for heat losses due to the higher temperature, is now about 30,100 B.t.u., an increase of 111%. Further, the heaters must now have a heating capacity of:

$$(30,100/3414) \times (60/26) = 20.4 \text{ kilowatts}$$

an increase of 111%.

These larger heaters greatly increase manufacturing cost and the additional power required for regeneration greatly increases operating cost.

It is of course possible to provide a fully heated dryer containing 192 lbs. of desiccant in each tank with smaller heaters, such as 10.4 kilowatts. Under these circumstances, the cycle time must be lengthened to provide longer heating and cooling periods, and the influent flow rating must be reduced proportionately to avoid over-saturating the bed. Thus, the same size dryer operated on a two hour drying cycle could use 10.4 kilowatt heaters, but would have to be rated for only 190 scfm, a decrease of 50% in capacity.

The dryers in accordance with the invention can be used for drying gases of all types, such as for drying small flows of compressed gases in instrument air, inert gas, and purge systems to dry relatively large volumes of compressed air or gas for industrial and laboratory purposes, and also of relatively large capacity to provide air or gases having sub-zero dewpoints.

The volume of desiccant bed required will be sufficient to provide in the heated portion of the bed the capacity needed for normal operation. There will also have to be provided a sufficient volume of reserve bed without heater units to meet any emergency requirement due to temporary overloading of the equipment, due to the supplying of a gas of an unusually high moisture content, or due to the supplying of the gas at a higher flow rate.

The drying systems in accordance with the invention can include moisture indicators and moisture control systems of various types to measure the effluent flow and to control the cycling between the spent and regenerated beds. Desiccant drain and fill ports can be provided to facilitate servicing of the desiccant, and outlet filters also can be supplied to prevent carryover of desiccant particles from the bed into other parts of the system.

In operation, the dryers of the invention will provide gas of low moisture content at considerably lesser operating cost than a conventional heat reactivated dryer. The reduction in heating capacity also reduces the time required for cooling of the bed, and the purge gas requirement can also be reduced, as compared to a conventional dryer.

While the invention has been described with principal emphasis on a desiccant dryer and a process for drying gases, it will be apparent to those skilled in the art that this apparatus with a suitable choice of adsorbent can be used for the adsorption of one or more polar gaseous components from a gaseous mixture with other polar and/or nonpolar gases. In such a case, the adsorbed polar component can also be removed from the sorbent by application of microwave energy and optionally, in addition, a reduction in pressure during regeneration. Thus, the process can be used for the separation of moisture and/or ozone and/or carbon dioxide or carbon monoxide from petroleum hydrocarbon streams and other gas mixtures containing the same, for the separation of moisture and/or ozone and/or carbon dioxide or carbon monoxide from nitrogen, for the separation of moisture and/or ozone and/or carbon dioxide or carbon monoxide from saturated hydrocarbons, and the like. Those skilled in the art are aware of sorbents which can be used for this purpose.

In many cases, sorbents useful for the removal of moisture from air can also be used, preferentially to adsorb one or more polar gas components from a mixture thereof, such as activated carbon, glass wool, adsorbent cotton, metal oxides and clays such as attapulgite and bentonite, fuller's earth, bone char and natural and synthetic zeolites. The selectivity of a zeolite is dependent upon the pore size of the material. The available literature shows the selective adsorptivity of the available zeolites, so that the selection of a material for a particular purpose is rather simple, and forms no part of the instant invention.

In some cases, the adsorbent can be used to separate a plurality of materials in a single pass. Activated alumina, for example, will adsorb polar gases such as water vapor, carbon dioxide, and ethanol vapor, in contrast to Mobil Sorbeads, which will adsorb only water vapor in such a mixture.

The apparatus employed for this purpose will be the same as that described and shown in FIGS. 1 and 2, inclusive, and the process is also as described, suitably modified according to the proportions of the components to be separated, the operating pressure and temperature, and the volume of available sorbent.

It will, however, be understood that the process is of particular application in the drying of gases, and that this is the preferred embodiment of the invention.

The following Example in the opinion of the inventors represents a preferred method of operation of a dryer system in accordance with the invention.

EXAMPLE 1

A two bed microwave-energy reactivatable dryer of the type shown in FIG. 1, having two desiccant beds 48 inches long, containing 150 lbs. of activated alumina, was used to dry atmospheric air of 90% to 100% relative humidity at 100° F. to 70° F. at 90 psig inlet pressure. The superficial flow velocity of the air was 47 cubic feet per minute, and inlet flow as 380 scfm, and the drying cycle was one hour, allowing two minutes for depressurization, two minutes for repressurization, and two minutes' delay for switching the beds. The microwave generator was operated during depressurization, and during regeneration the temperature of the outlet purge gas was 160° F. and relative humidity 80%. Purge flow as 1.9 scfm, regeneration time was 30 minutes, and cooling time 30 minutes.

It was apparent from the data for a large number of runs that in each run the microwave generation system had substantially fully regenerated the bed by the time the cycle was terminated at a safe moisture level in the effluent gas. It was also clear from the different times of the cycle that it was possible to adjust cycle length to match variation in moisture level of the influent air, and thus preserve desiccant life by cutting down the number of regenerations materially, without affecting appreciably the completeness of the regeneration.

Having regard to the foregoing disclosure, the following is claimed as the inventive and patentable embodiments thereof:

1. In the process for removing a first polar gas from a mixture thereof with a second gas by flow of the gas mixture continuously through a stationary sorbent bed having a preferential affinity for the first polar gas which includes the steps of passing the gas mixture in contact with and from one end to another end of a first bed of the sorbent; sorbing first polar gas thereon and, as the sorption of the first polar gas continues, forming a concentration gradient of first polar gas in the first bed progressively decreasing from one end to the other end of the bed ranging from a substantial proportion of the first sorbent capacity therefor at one end to less than 20% of its capacity therefor at the other end, so as to produce a gaseous effluent which has a concentration of the first polar gas therein below a predetermined maximum; removing first polar gas sorbed on the second sorbent bed by passing a purge flow of effluent gas in contact with the sorbent bed, discontinuing the purge flow, and then resuming passing the gas mixture in contact with the sorbent bed, the improvement which consists essentially in utilizing a sorbent transparent to microwave energy having a frequency within the range of about 0.03 to about 3000 giga Hertz, and desorbing first polar gas by applying during the purge flow microwave energy having a frequency within the range of about 0.03 to about 3000 giga Hertz at a temperature at which the sorbent is transparent to microwave energy, the microwave energy being preferentially absorbed by the first polar gas sorbed on the sorbent, and this gas thereby being desorbed, and halting application of the microwave energy when desorption of first polar gas is substantially complete, and before water of hydration of the sorbent is removed.

2. A process according to claim 1 in which the application of microwave energy is at a temperature below about 500° F.

3. A process according to claim 2 in which the sorbent is a desiccant.

4. A process according to claim 1 in which the sorbed material is water.

5. A process according to claim 4 in which the sorbent is a molecular sieve.

6. A process according to claim 4 in which the sorbent is alumina.

7. A process according to claim 4 in which the sorbent is silica gel.

8. A process according to claim 1 in which the purge gas is at effluent gas temperature and is not heated.

9. A process for reducing the concentration of a first polar gas in a mixture thereof with a second gas to below a limiting maximum concentration thereof in the second gas, which consists essentially in passing the mixture in contact with and from one end to another of a stationary bed of a sorbent having a preferential affinity for the first polar gas, and transparent to microwave energy having a frequency within the range of about 0.03 to about 3000 giga Hertz; adsorbing first polar gas thereon to form a gaseous effluent having a concentration thereof below the maximum, and as the adsorption continues forming a concentration gradient of first polar gas on the bed progressively decreasing from the one end to the other end, and an increasing concentration of first polar gas in the second gas defining a concentration front progressively advancing in the bed from the one end to the other end as sorbent capacity therefor decreases; discontinuing passing the gaseous mixture in contact with the bed before the front can leave the bed, and the limiting maximum concentration of first polar gas in the second gas can be exceeded; and then desorbing the first polar gas adsorbed on the sorbent bed by application of microwave energy having a frequency within the range of about 0.03 to about 3000 giga Hertz at a temperature at which the sorbent is transparent to microwave energy while passing therethrough a purge gas flow to flush desorbed first polar gas from the bed.

10. A process according to claim 9 in which the application of microwave energy is at a temperature below about 500° F.

11. A process according to claim 9 in which purge gas is gaseous effluent from the adsorption.

12. A process according to claim 9 in which the desorption is at a gas pressure lower than that during adsorption.

13. A process according to claim 9 in which the desorption is of a duration less than the sorption, and application of microwave energy is discontinued when desorption is substantially complete.

14. A process according to claim 9 in which at least two sorbent beds are used, and adsorption is carried on in one sorbent bed while another sorbent bed is being desorbed, so that adsorption is continuous and always in progress in at least one of the sorbent beds.

15. A process in accordance with claim 9 in which the first polar gas is water vapor.

16. A process in accordance with claim 9 in which the sorbent is silica gel.

17. A process in accordance with claim 9 wherein the purge flow is of effluent gas from the bed sorbing the first polar gas.

18. A process in accordance with claim 9 which comprises removing sorbed first polar gas at a reduced pressure relative to the pressure of adsorption.

19. An apparatus for reducing the concentration of a first polar gas in a mixture thereof with a second gas to below a limiting maximum concentration thereof comprising, in combination, a stationary bed of sorbent having a preferential affinity for the first polar gas; and transparent to microwave energy having a frequency within the range of about 0.03 to about 3000 giga Hertz; an inlet line for delivering influent gas at an inlet end of the bed; and an outlet line for delivering effluent gas from an outlet end of the bed; means for applying to the sorbent bed microwave energy having a frequency within the range of about 0.03 to about 3000 giga Hertz for desorbing first polar gas from the bed at the conclusion of an adsorption cycle; and means for supplying a flushing flow of purge gas during application of microwave energy to remove desorbed first polar gas from the bed.

20. An apparatus according to claim 19 comprising at least two sorbent beds disposed in separate chambers and connected to the lines for reception of influent gas to be dried, and for delivery of effluent gas; and at least one valve for cycling the flow of influent gas to one of the beds at a time, and for receiving the flow of effluent gas from one of the beds at a time.

21. An apparatus according to claim 20 comprising a pressure-reducing valve for reducing pressure during desorption.

22. An apparatus according to claim 20 comprising a valve to divert a portion of the dried effluent gas as purge through the bed being desorbed.

23. An apparatus according to claim 20 comprising a valve to divert a portion of the dried effluent gas as purge in counterflow through the bed being desorbed.

24. An apparatus according to claim 19 in which the microwave generator comprises a magnetron tube as a source of microwave energy.

25. An apparatus according to claim 19 in which the microwave generator comprises a amplitron tube as a source of microwave energy.

* * * * *